United States Patent
Sivakumar et al.

(10) Patent No.: US 12,033,067 B2
(45) Date of Patent: Jul. 9, 2024

(54) QUANTIZING NEURAL NETWORKS WITH BATCH NORMALIZATION

(71) Applicant: Google LLC, Mountain View, CA (US)

(72) Inventors: Suharsh Vikram Sivakumar, San Francisco, CA (US); Raghuraman Krishnamoorthi, San Ramon, CA (US)

(73) Assignee: Google LLC, Mountain View, CA (US)

( * ) Notice: Subject to any disclaimer, the term of this patent is extended or adjusted under 35 U.S.C. 154(b) by 1374 days.

(21) Appl. No.: 16/262,772

(22) Filed: Jan. 30, 2019

(65) Prior Publication Data

US 2020/0134448 A1    Apr. 30, 2020

Related U.S. Application Data

(60) Provisional application No. 62/753,595, filed on Oct. 31, 2018.

(51) Int. Cl.
G06N 3/08 (2023.01)
G06F 7/483 (2006.01)
G06N 3/04 (2023.01)

(52) U.S. Cl.
CPC .............. *G06N 3/08* (2013.01); *G06F 7/483* (2013.01); *G06N 3/04* (2013.01)

(58) Field of Classification Search
CPC . G06N 3/08; G06N 3/04; G06N 3/063; G06F 7/483; G06F 2207/4824
See application file for complete search history.

(56) References Cited

U.S. PATENT DOCUMENTS

| | | | | |
|---|---|---|---|---|
| 2017/0286830 A1* | 10/2017 | El-Yaniv | ............... | G06N 3/0454 |
| 2018/0107451 A1* | 4/2018 | Harrer | ................. | G06N 3/0454 |
| 2018/0322391 A1* | 11/2018 | Wu | ........................ | G06N 3/084 |
| 2019/0279072 A1* | 9/2019 | Gao | ........................ | G06N 3/08 |

(Continued)

FOREIGN PATENT DOCUMENTS

WO    WO-2018148526 A1 *  8/2018  ............. G06F 17/18

OTHER PUBLICATIONS

Jacob et al. "Quantization and Training of Neural Networks for Efficient Integer-Arithmetic-Only Inference" (Year: 2017).*

(Continued)

*Primary Examiner* — Abdullah Al Kawsar
*Assistant Examiner* — Tewodros E Mengistu
(74) *Attorney, Agent, or Firm* — Fish & Richardson P.C.

(57) ABSTRACT

Methods, systems, and apparatus, including computer programs encoded on a computer storage medium, for training a neural network that has one or more batch normalized neural network layers for use by a quantized inference system. One of the methods includes receiving a first batch of training data; determining batch normalization statistics for the first batch of training data; determining a correction factor from the batch normalization statistics for the first batch of training data and the long-term moving averages of the batch normalization statistics; generating batch normalized weights from the floating point weights for the batch normalized first neural network layer, comprising applying the correction factor to the floating point weights of the batch normalized first neural network layer; quantizing the batch normalized weights; determining a gradient of an objective function; and updating the floating point weights using the gradient.

20 Claims, 3 Drawing Sheets

(56) References Cited

U.S. PATENT DOCUMENTS

2019/0325315 A1\* 10/2019 Ioffe ............... G06N 3/084
2019/0340500 A1\* 11/2019 Olmschenk .......... G06N 3/0472

OTHER PUBLICATIONS

Migacz [online], "8-Bit Inference with TensorRT," May 8, 2017, [retrieved Jun. 25, 2019], retrieved from: URL<http://on-demand.gputechconf.com/gtc/2017/presentation/s7310-8-bit-inference-with-tensorrt.pdf>, 41 pages.
Abadi et al [online], "Tensorflow: Large-scale machine learning on heterogeneous systems" Nov. 2015 [retrieved: Jun. 7, 2019] retrieved from: URL <https://static.googleusercontent.com/media/research.google.com/en//pubs/archive/45166.pdf> 19 pages.
Courbariaux et al, "Binaryconnect: Training deep neural networks with binary weights during propagations" arXiv, Nov. 2015, 9 pages.
developer.andriod.com [online.com], "Neural Network API", avialable on or before Oct. 26, 2017, via Internet Archive: Wayback Machine URL, <https://web.archive.org/web/20171026105951/https://developer.android.com/ndk/guides/neuralnetworks/index.html>, retreived on Aug. 13, 2019, URL<https://developer.android.com/ndk/guides/neuralnetworks>, 15 pages.
github.com [online], "Building a quantization paradigm from first principles," Date, [retrieved on Jun. 25, 2019], retrieved from: URL<https://github.com/google/gemmlowp/blob/master/doc/quantization.md#implementationof-quantized-matrix-multiplication>, 9 pages.
github.com[online], "Intel® Math Kernel Library for Deep Neural Networks" 2019, [retrieved on Jul. 6, 2019], retrieved from: URL<https://github.com/intel/mkl-dnn>, 4 pages.
Han et al, "Deep compression: Compressing deep neural network and pruning, trained quantization and huffman coding" arXiv, Nov. 2015, 13 pages.
Han et al, "EIE: efficient inference engine on compressed deep neural network" arXiv, May 2016, 12 pages.
He et al, "ADC automated deep compression and acceleration with reinforcement learning",arXiv, Feb. 10, 2018, 12 pages.
He et al, "Deep residual learning for image recognition" arXiv, Dec. 2015, 12 pages.
He et al, "Identity mappings in deep residual networks" arXiv, Jul. 2016, 15 pages.
Hinton et al, "Distilling the Knowledge in a Neural Network" arXiv, Mar. 2015, 9 pages.
Howard et al, "MobileNets: Efficient Convolutional Neural Networks for Mobile Vision Applications" arXiv, Apr. 2017, 9 pages.
Iandola et al, "Squeezenet: Alexnet-level accuracy with 50x fewer parameters and <1mb model size" arXiv, Apr. 2016, 9 pages.
Ioffee et al, "Batch normalization: Accelerating deep network training by reducing internal covariate shift" arXiv, Mar. 2015, 11 pages.
Jacob et al, "Quantization and Training of Neural Networks for Efficient Integer-Arithmetic-Only Inference" arXiv, Dec. 2017, 14 pages.
Krishnamoorthi et al, "Quantizing networks with batch normalization," arXiv, Jun. 21, 2018, 36 pages.
Mishra et al, "Apprentice: Using knowledge distillation techniques to improve low-precision network accuracy" arXiv, Nov. 2017, 15 pages.
Mishra et al, "WRPN: wide reduced precision networks" arXiv, Sep. 2017, 11 pages.
nvdla.org [online], "NVLDA Deep Learning Accelerator," 2018, [retrieved on Jun. 25, 2019], retreived from: URL<http://nvdla.org/> 6 pages.
Polino et al, "Model compression via distillation and quantization" arXiv, Feb. 2018, 21 pages.
Polyak, "Acceleration of Stochastic Approximation by averaging." Semantic Scholar, Jul. 1992, 18 pages.
qualcomm.com [online], "Qualcomm OnQ blog: How can Snapdragon 845's new AI boost your smartphone's IQ?," 2019, [retrieved on Aug. 13, 2019], retrieved from: URL<https://www.qualcomm.com/news/onq/2018/02/01/how-can-snapdragon-845s-new-ai-boost-your-smartphones-iq>, 8 pages.
Sandler et al, "Inverted residuals and linear bottlenecks: Mobile networks for classification, detection and segmentation" arXiv, Apr. 2018, 14 pages.
Sheng et al, "A quantization-friendly seperable convolution for mobilenets" arXiv, Mar. 2018, 5 pages.
Sze et al, "Efficient processing of deep neural networks" A tutorial and survey arXiv, Aug. 2017, 32 pages.
Szegedy et al, "Rethinking the Inception Architecture for Computer Vision" arXiv, Dec. 2015, 10 pages.
tensorflow.org [online], "Exponential moving average", Date, [retrieved on Jun. 25, 2019], retrieved from: URL<https://www.tensorflow.org/api_docs/python/tf/train/ExponentialMovingAverage>, 7 pages.
Zoph et al, "Learning transferable architectures for scalable image recognition" arXiv, Dec. 2017, 14 pages.
github.com [online], "Gemmlowp: a small self-contained low-precision GEMM library," 2019, retrieved on Jul. 6, 2019, retrieved from URL<https://github.com/google/gemmlowp>, 5 pages.

\* cited by examiner

QUANTIZING NEURAL NETWORKS WITH BATCH NORMALIZATION

CROSS-REFERENCE TO RELATED APPLICATION

This application claims priority to U.S. Provisional Application No. 62/753,595, filed on Oct. 31, 2018. The disclosure of the prior application is considered part of and is incorporated by reference in the disclosure of this application.

BACKGROUND

This specification relates to training neural networks for use in performing quantized inference.

Neural networks are machine learning models that employ one or more layers of nonlinear units to predict an output for a received input. Some neural networks include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification describes a neural network system implemented as computer programs on one or more computers in one or more locations that trains a neural network that includes one or more batch normalized layers. In particular, the system trains the neural network so that the neural network can be effectively used to perform quantized inference after training has been completed.

Particular embodiments of the subject matter described in this specification can be implemented so as to realize one or more of the following advantages.

The training system described in this specification effectively trains a neural network that employs batch normalization for later use for quantized inference. Quantized inference is advantageous because it consumes fewer computational resources than other inference techniques. However, training neural networks for quantized inference, i.e. to have high performance even though computation during inference is quantized, is a challenge, particularly when the neural networks implement batch normalization. The described techniques allow the training system to effectively implement batch normalization to improve the training of a neural network that will later be used to perform quantized inference, improving the performance of the trained neural network relative to conventional approaches.

In particular, the neural network being trained includes one or more batch normalized neural network layers. To effectively train the neural network, for each batch normalized layer, the system applies a correction factor to floating-point weights for the batch normalized layer before the weights are quantized. This allows the training system to switch from using batch statistics to long-term moving averages for batch normalization after sufficient training has occurred.

In contrast, conventionally, when employed for a given layer, batch normalization normalizes the output of the layer before providing the normalized outputs to another layer in the neural network. Conventional batch normalization uses batch normalization statistics for the current batch of training data to perform the normalization during training and statistics representing the overall training data to perform normalization during inference. Batch normalization accounts for changes in distribution of the layers outputs during training and between training and inference.

However, when performing the forward step using quantized weights and due to variation in batch statistics across batches, applying batch normalization in this manner introduces jitter in the quantized weights during training and degrades the accuracy of the quantized neural network after training. Training with excess jitter results in poor inference system performance.

Therefore, by using a modified batch normalization technique of switching from using batch statistics to long-term moving average for batch normalization after sufficient training has occurred, the neural network system as described in this specification has superior performance (e.g., prediction accuracy) after training and fewer resources consumed (i.e., by the inference system) than conventional neural network systems.

For example, by causing the batch normalized layer outputs generated during training to be well-matched to the batch normalized layer outputs generated during inference, the batch normalized layer generates similar outputs during training and inference. Thus, adjustments made to the batch normalization technique of the neural network system during training results in improvements to the performance of the neural network system during inference, which would not necessarily be the case if the batch normalized layer generated different outputs for inference than during training (as do, e.g., conventional batch normalization layers).

Moreover, since the trained neural network system as described in this specification is efficiently trained to be used for quantized inference than conventional neural network systems, it consumes fewer computational resources (e.g., memory and computing power) during inference.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
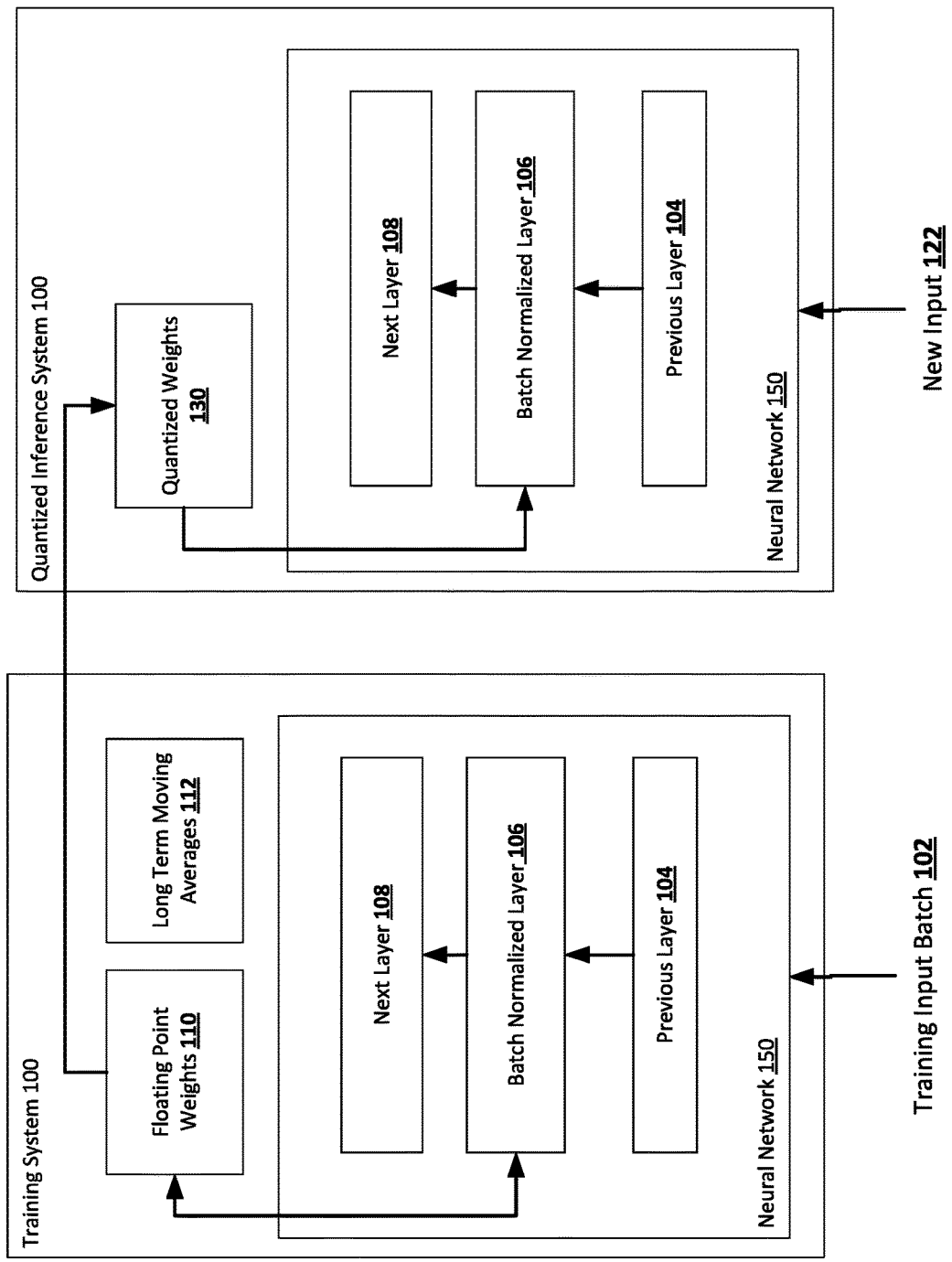
FIG. 1 shows an example neural network training system and an example quantized inference system.

FIG. 1 shows an example neural network training system 100 and an example quantized inference system 120. The training neural network system 100 and the quantized inference system 120 are examples of systems that are each implemented as computer programs on one or more computers in one or more locations, in which the systems, components, and techniques described below can be implemented.

The neural network training system 100 trains a neural network 150 that generates neural network outputs from neural network inputs by processing the neural network inputs through each of the neural network layers in the neural network. In particular, the neural network training system 100 trains the neural network to determine trained values of the weights of the neural network from initial values of the weights. The initial values can be randomly initialized values or values generated through some other parameter initialization scheme.

Once the neural network 150 has been trained, the quantized inference system 120 uses the trained neural network 150 to perform inference. That is, the quantized inference system 120 receives new neural network inputs 122, e.g., from users of the system, and processes those new neural network inputs 122 using the trained neural network 150 to generate new network outputs.

Generally, the quantized inference system 120 performs quantized inference. That is, the quantized inference system 120 stores and calculates numbers with reduced precision, i.e., in a compact format, while performing inference. For example, the quantized inference system 120 may perform inference using special-purpose hardware that is configured to perform computation using fixed point arithmetic in order to allow the hardware to compute inferences with reduced latency. As another example, the quantized inference system 120 may be implemented on a mobile device and may perform quantized inference to limit the amount of computational resources consumed by computing inferences.

More specifically, to compute an inference for a new neural network input 122, the quantized inference system 120 quantizes the received input 122 and processes the quantized input using the neural network 150 in accordance with values of the weights that have been quantized 130. Quantizing a value refers to constraining a value from a continuous or otherwise large set of values to a smaller, discrete set in accordance with a mapping scheme that defines, for each value in the larger set, a mapping to a corresponding value in the smaller set. Such a scheme will be referred to in this specification as a quantization scheme. For example, quantizing can map a floating-point data type value to a fixed point data type value.

In order to ensure high quality performance of the neural network 150 when used by the quantized inference system 120, the neural network training system 100 trains the neural network 150 to optimize for being used for quantized inference. That is, the neural network training system 100 trains the neural network 150 to generate accurate outputs for new inputs 122 after training even though the precision of the computations employed during inference is reduced.

However, because of the loss of precision that comes with using the more compact representation that is employed by the quantized inference system 120, using only quantized values during training generally does not result in the trained neural network 150 achieving acceptable performance once it has been trained.

Instead, to improve the effectiveness of the training process, the neural network training system 100 maintains and updates floating-point weights 110 during the training of the neural network 150. In particular, the system 100 trains the neural network 150 by performing multiple iterations of a neural network training procedure, e.g., stochastic gradient descent or another gradient-descent based training procedure, to optimize a specified objective function.

At each iteration of the training procedure, the neural network training system 100 receives a batch of training data 102 that includes multiple training inputs and, for each training input, a respective target network output. The system 100 uses the batch of training data to determine an update to the maintained floating-point weights 110.

In particular, during a given iteration of the training procedure being used to train the neural network 150, the system 100 quantizes the current floating-point weights 110. The system then receives the batch of training data for the iteration and uses the quantized weights to perform a forward pass through the neural network 150, i.e., to process the training inputs 102 in the batch using the neural network 150 in accordance with the quantized weights, to generate a respective output for each training input in the batch of training data. The system 100 then performs a backward pass of the training procedure to compute a gradient of the objective function with respect to the quantized weights, e.g., using backpropagation, and determines an update to the floating-point weights from the gradient, e.g., using the update rule corresponding to the neural network training procedure.

To further improve the performance of the trained neural network 150, the neural network training system 100 employs batch normalization for one or more of the layers in the neural network 150. A layer for which batch normalization is employed is referred to in this specification as a batch normalized neural network layer 106. As can be seen in the example of FIG. 1, the neural network 150 includes a first batch normalized layer 106. Although FIG. 1 shows only a single batch normalized layer 106, the neural network 150 can include a single batch normalized layer or multiple batch normalized layers. For example, most or all of the layers of the neural network 150 can be batch normalized neural network layers.

Conventionally, when employed for a given layer, batch normalization normalizes the output of the layer before 104 providing the normalized outputs to another layer 108 in the neural network 150. Conventional batch normalization uses batch normalization statistics for the current batch of training data to perform the normalization during training and long term moving statistics, e.g., overall batch normalization statistics from all of the training data or statistics from processing a large number of new network inputs post-training, to perform the normalization during inference. Applying batch normalization reduces dependencies across layers while significantly improving the accuracy of the neural network 150 after training by ensuring that the distribution of the layer outputs does not change during training and between training and inference.

However, when performing the forward step using quantized weights and due to variation in batch statistics across batches, applying batch normalization in this manner introduces jitter in the quantized weights during training and degrades the accuracy of the quantized neural network 150 after training. Jitter is artificial noise injected into the training data. Training with sufficient jitter can improve model performance, but an excess results in poor inference system performance.

To account for this and to optimize the training of the neural network 150 for quantized inference while still realizing the benefits of batch normalization, the system 100 employs batch normalization in a different manner.

In particular, for at least some of the iterations of the training process, the neural network training system 100 determines a correction factor for the floating-point weights of the batch normalized neural network layer and generates batch normalized weights from the floating point weights using the correction factor.

In particular, in order to compute the correction factor, the neural network training system 100 maintains long-term moving averages 112 of batch normalization statistics for the batch normalized layer 106 during training. For the given batch, the training system 100 determines the correction factor from the long-term moving averages 112 of the batch normalization statistics and the current batch normalization statistics for the current batch. After the batch has been processed, the training system 100 updates the maintained moving averages 112.

The system 100 then quantizes the batch normalized weights, i.e., instead of directly quantizing the floating points weights, and uses the quantized batch normalized weights in determining the update for the iteration.

Determining the correction factor and updating the weights are described in more detail below with reference to FIG. 2.

Once the neural network 150 has been trained, the training system 100 can quantize the final floating-point weights and provide the final quantized weights to the quantized inference system 120, e.g., over a data communication network, for use in performing inference. Alternatively, the training system 100 can provide the final floating-point weights and the quantized inference system 120 can quantize the provided weights before using the weights for performing inference.

Figure 2:
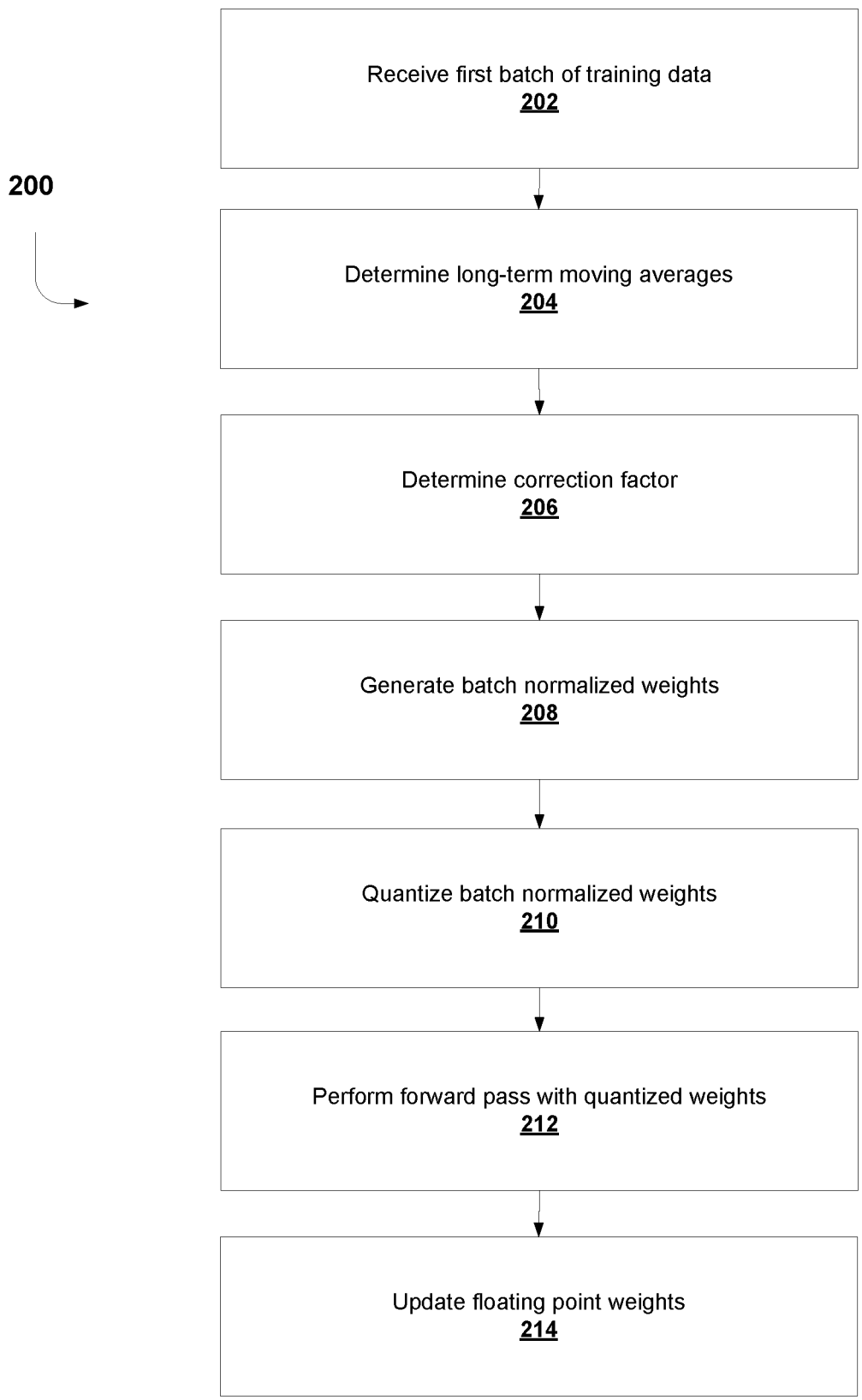
FIG. 2 is a flow diagram of an example process for updating the floating-point weights for the batch normalized neural network layer during the training of the neural network on a batch of training data.

FIG. 2 is a flow diagram of an example process for training a batch normalized layer on a batch of training data. For convenience, the process 200 will be described as being performed by a system of one or more computers located in one or more locations. For example, a neural network training system, e.g., the neural network training system 100 of FIG. 1, appropriately programmed in accordance with this specification can perform the process 200.

As previously mentioned, the training system uses a modified batch normalization technique to optimize the training of the neural network to utilize batch normalization and quantized inference. The process 200 describes the modified batch normalization technique operations performed to update the floating-point weights for the batch normalized neural network layer during the training of the neural network on a batch of training data.

The system receives a batch of layer inputs to the batch normalized layer (step 202). The batch of layer inputs includes a respective layer input for each training input in the batch and may have been generated by the system by performing a forward pass through the layer or layers before the batch normalized layer in the neural network using the quantized weights for those layers.

The system computes the batch normalization statistics for the batch (step 204). To compute the batch normalization statistics, the system performs the operations of the layer on the layer inputs using the floating point weights to generate initial layer outputs. For example, when the layer is a convolutional layer, the system can perform, for each layer input, a convolution of the layer input and the floating point weights to generate the initial layer output. As another example, when the layer is a fully-connected layer, the system can perform, for each layer input, a matrix multiplication of the layer input and the floating point weights to generate the initial layer output.

The system then determines the batch normalization statistics for the batch from the initial layer outputs, i.e., computes the average and standard deviation of the initial layer outputs.

The system determines a correction factor for the floating-point weights for the batch normalized layer from the batch normalization statistics (step 206). As described above, the system maintains long-term moving averages of batch normalization statistics for the batch normalized layer. The system determines the correction factor to be a ratio of the batch standard deviation in the batch normalization statistics for the batch to the long-term moving standard deviation of the long-term moving averages.

Furthermore, after at least some of the iterations of the process 200, the training system updates the maintained moving averages after the batch has been processed, i.e., by accounting for the current batch normalization statistics in the long-term moving averages.

The system generates batch normalized weights by scaling the floating point weights using the correction factor (step 208). In particular, the system determines the batch normalized weights as:

$$\text{batch normalized weights} = \frac{\sigma B}{\sigma} \times \frac{\gamma W}{\sigma B}$$

$$\text{batch normalized weights} = \frac{\gamma W}{\sigma}$$

where, $\Gamma B$ is the batch standard deviation, $\Gamma$ is the moving standard deviation, Y is a positive constant value or a value that is learned during the training of the neural network, and W are the floating point weights. By generating the batch normalized weights in this manner, the system removes the direct dependency on the current batch standard deviation, reducing the jitter caused by batch to batch variation. As will be described in more detail below with reference to FIG. 3, at certain points during the training the system can undo the impact of the correction factor to allow the training to still benefit from the application of batch normalization.

The system quantizes the batch normalized weights (step 210). The system can use any appropriate quantization scheme to quantize the weights. For example, the system can use an affine uniform quantizer. An affine uniform quantizer uses affine transformations to normalize the batch normalized weights. The affine transformation preserves points, straight lines and planes between the affine spaces, i.e. the batch normalized weights and batch normalized weights after quantization. The affine uniform quantizer is defined by the parameters of xmin, xmax, and Nbits. The quantizer, Q(x):

$$Q(x) = \Delta \text{ round} \left( \frac{sat(x) - x\min}{\Delta} \right)$$

is defined as delta multiplied by rounding the ratio of xmin subtracted from sat(x) to delta. In particular, delta is represented as:

$$\Delta = \frac{x\max - x\min}{2^N \text{bits} - 1}$$

a ratio between xmin subtracted from xmax to one subtracted from two bits to the power of N. Furthermore, the function sat(x):

$$sat(x) = \begin{cases} x\min \text{ if } x \leq x\min \\ x \text{ if } x\min \leq x \leq x\max \\ x\max \text{ if } x\max \leq x \end{cases}$$

defines xmin if x is less than or equal to xmin, x as less than or equal xmin and greater than or equal to xmax, and xmax is greater than or equal to x. The affine quantizer accounts for the inference system's limited available computational resources by performing rounding that is deterministic and corresponds to asymmetric rounding, which is supported in almost all hardware platforms.

The system uses the quantized weights as input to perform the forward pass (step 212), i.e., to perform the operations of the layer for the forward pass. Performing the forward pass for the layer using the quantized weights is described in more detail below with reference to FIG. 3.

The system updates the floating weights (step 214). To update the floating point weights, the system performs a backward pass of the training procedure to compute a gradient of the objective function being used for the training of the neural network with respect to the quantized weights for the layer. During the backward pass, the quantizer is modeled as a piecewise linear block. This helps to compute the gradients during the backward pass, because derivatives of Q(x) are non-zero in the linear regions and zero elsewhere:

$$\frac{dQ(x)}{dx} = 1, x\min \le x \le x\max, 0 \text{ elsewhere}$$

Specifically, the derivative of the quantizer with respect to x is evaluated to one if x is between xmax and xmin, i.e. the linear region. If this criteria is not met, the gradient, evaluating the derivative with respect to x, is set to zero.

The system then determines an update to the floating-point weights from the gradient, e.g., using the update rule corresponding to the neural network training procedure.

Figure 3:
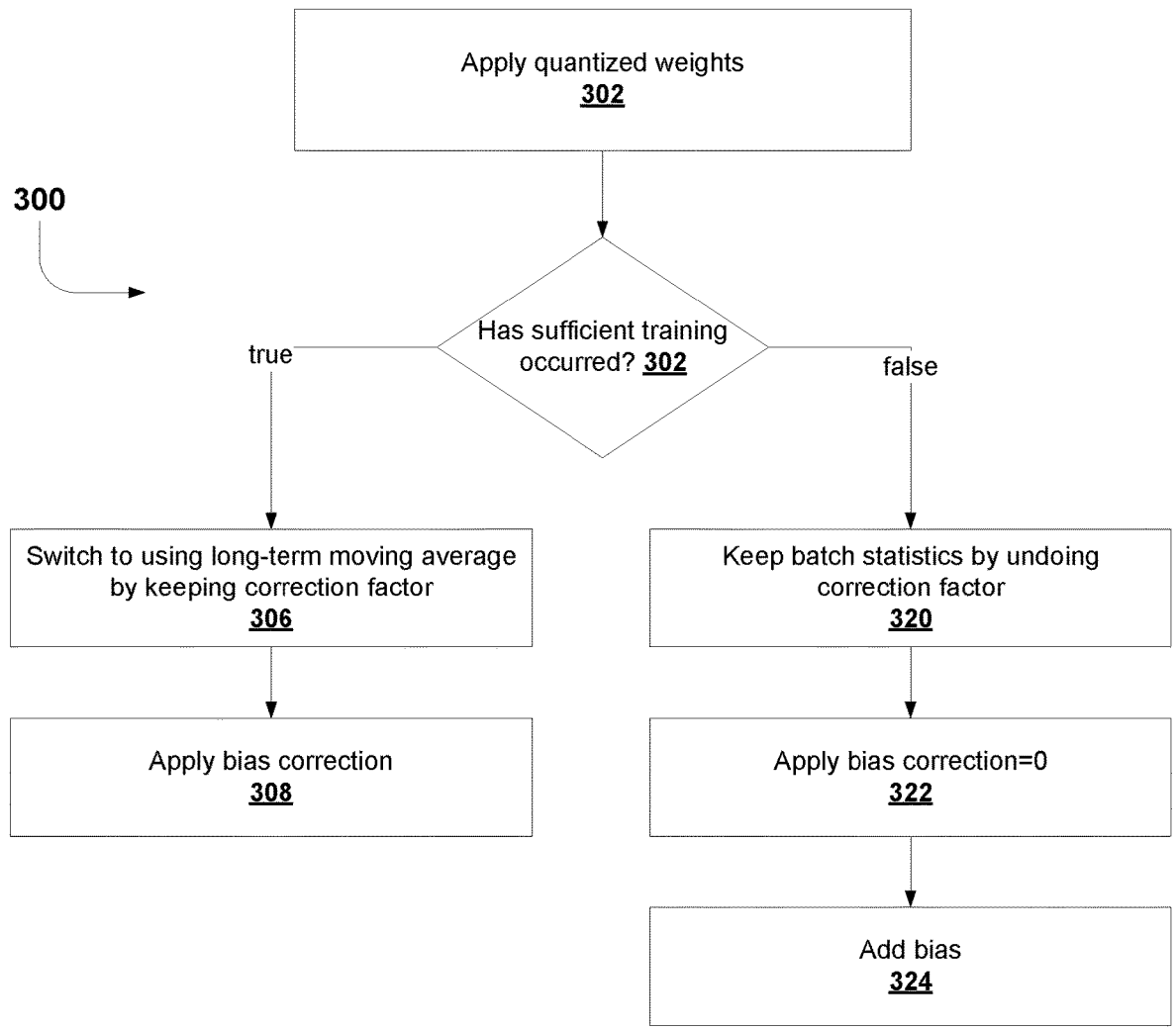
FIG. 3 is a flow diagram of an example process for performing a forward pass through the batch normalized layer.

FIG. 3 is a flow diagram of an example process 300 for performing a forward pass through the batch normalized layer. For convenience, the process 300 will be described as being performed by a system of one or more computers located in one or more locations. For example, a neural network training system, e.g., the neural network training system 100 of FIG. 1, appropriately programmed in accordance with this specification can perform the process 300.

The system applies the quantized weights to the layer inputs in the batch to generate an initial quantized layer output for each layer input in the batch (step 302). For example, if the layer is a convolutional layer, the system performs a convolution between the each layer input and the quantized weights. If the layer is a fully-connected layer, the system performs a multiplication between each layer input and the quantized weights.

The system determines if sufficient training has occurred as of the current iteration of the process 300 (step 304). As described above with reference to FIG. 1, traditional batch normalization uses batch normalization statistics during training and long term moving statistics during inference. Due to variation in batch statistics across batches, applying batch normalization in this manner introduces jitter in the quantized weights during training and degrades the accuracy of quantized neural network after training when the neural network is being trained for later use with quantized inference. In particular, the batch normalization statistics are sensitive to the batch data of which the statistics are derived from. If there are outliers in the current batch, the current batch statistics will differ from the previous batch statistics and the long-term moving averages, causing undue jitter in the quantized weights.

The system accounts for the jitter by switching to using the long-term moving averages over batch statistics after sufficient training has occurred. The system can determine that sufficient training has occurred once the batch normalization statistics start to stabilize. For example, the system can determine that sufficient training has occurred once a threshold number of training iterations, i.e., a threshold number of iterations of the process 200, have been performed or once the batch normalization statistics for a threshold number of consecutive batches remain within a certain threshold of the long-term moving averages. In some cases, the first time that the system determines that sufficient training has occurred, the system freezes the long-term moving averages, i.e., keeps the moving averages constant for the remainder of the training instead of continuing to update the averages after each new batch of training data has been processed.

If the system determines sufficient training has occurred, the system keeps, i.e., does not undo, the correction factor applied to produce batch normalized weights (step 306). By keeping the correction factor, the long term moving averages are used rather than the batch statistics, i.e., the batch normalization statistics for the current batch are not used in applying the quantized weights for the forward pass. Thus, no undue jitter is introduced into the training process from the current batch statistics differing from the long-term moving averages after the long-term moving averages have already stabilized.

The system then determines a bias correction (step 308) to the bias that is to be added to the result of applying the quantized weights to the layer inputs, i.e., to the initial quantized layer outputs:

$$biascorrection = \gamma\left(\frac{\mu B}{\sigma B} - \frac{\mu}{\sigma}\right)$$

where β is a value that is either constant or learned as part of the training of the neural network, and μB and μ are the batch mean and moving average mean respectively.

Bias correction may be applied in multiple ways. For example, bias correction may be added, multiplied or replace the bias entirely. If the system adds the bias with the bias correction to the result of applying the quantized weights to the layer inputs to generate the layer output for the layer, the bias (before correction) can be expressed as $$bias = \beta - \frac{\gamma \mu B}{\sigma B}$$

where B and Y are constant positive values or are learned during the training of the neural network.

If the system determines that sufficient training has not occurred, the system undoes the correction factor (step 320) of the quantized weights. Undoing the correction factor to generate a corrected initial quantized output, i.e. the corrected y, is represented as:

$$ycorrected = \frac{y}{c} \qquad (1)$$

where c is the correction factor as described above and y is an initial quantized output. Undoing the correction factor results in the batch statistics being used to scale the weights rather than the long-term moving averages.

The system does not apply a bias correction (step 322) and instead adds the bias (step 324) to the corrected initial quantized output after undoing the correction factor. As above, the bias is represented as:

$$\text{bias} = \beta - \frac{\gamma \mu B}{\sigma B}$$

In some cases, the layer is also configured to apply an activation function, e.g., a relu or sigmoid activation function. In these cases, the system applies the activation function to each layer output after adding the bias to generate a final layer output (regardless of whether sufficient training has occurred).

The system then determines an update to the floating-point weights from the gradient, e.g., using the update rule corresponding to the neural network training procedure.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method of training a neural network that has a batch normalized first neural network layer, the method comprising:
    during the training, maintaining (i) moving averages of batch normalization statistics for the batch normalized first neural network layer and (ii) floating point weights for the batch normalized first neural network layer;
    receiving a first batch of training data;
    processing the first batch of training data through one or more layers of the neural network to generate a batch of layer inputs to the batch normalized first neural network layer;
    determining batch normalization statistics for the first batch of training data using the floating point weights, comprising:
        performing operations of the batch normalized first neural network layer on the batch of layer inputs using the floating point weights to generate a batch of initial layer outputs; and
        computing batch normalization statistics based on the batch of initial layer outputs;
    determining a correction factor from the batch normalization statistics for the first batch of training data and the moving averages of the batch normalization statistics;
    generating batch normalized weights from the floating point weights for the batch normalized first neural network layer using the correction factor, comprising applying the correction factor to the floating point weights of the batch normalized first neural network layer;

quantizing the batch normalized weights to generate quantized batch normalized weights;
after quantizing the batch normalized weights, performing operations of the batch normalized first neural network layer on the batch of layer inputs using the quantized batch normalized weights to generate a batch of layer outputs, comprising:
applying the quantized batch normalized weights to each of the batch of layer inputs to generate a respective initial output for each layer input in the batch of layer inputs;
determining whether the training of the neural network has reached a first threshold;
in response to determining that the training of the neural network has reached the first threshold, switching to using a long-term moving average of the batch normalization statistics by refraining from dividing each respective initial output by the correction factor to introduce a dependence on the batch normalization statistics;
determining, using the batch of layer outputs, a gradient of an objective function with respect to the quantized batch normalized weights for the first neural network layer; and
updating the floating point weights of the first neural network layer using the gradient with respect to the quantized batch normalized weights.

2. The method of claim 1, wherein the batch normalization statistics include a standard deviation for the batch and a mean for the batch and the moving averages include a standard deviation moving average and a mean moving average.

3. The method of claim 2, wherein the correction factor is based on a ratio of standard deviation for the batch to the standard deviation moving average.

4. The method of claim 1, wherein applying the correction factor comprises multiplying the floating point weights by the correction factor.

5. The method of claim 1, wherein performing operations of the batch normalized first neural network layer on the batch of layer inputs using the quantized batch normalized weights to generate a batch of layer outputs comprises:
refraining from applying a bias correction to the initial outputs.

6. The method of claim 1, wherein performing operations of the batch normalized first neural network layer on the batch of layer inputs using the quantized batch normalized weights to generate a batch of layer outputs comprises:
applying a bias correction to each initial output to generate the batch of layer outputs.

7. The method of claim 1, wherein performing operations of the batch normalized first neural network layer on the batch of layer inputs using the quantized batch normalized weights to generate a batch of layer outputs comprises:
adding a bias to each initial output.

8. The method of claim 1, further comprising updating the moving averages based on the batch normalization statistics for the first batch.

9. The method of claim 1, wherein determining whether the training of the neural network has reached a first threshold comprises:
determining whether a threshold number of training iterations have occurred; or
determining whether batch normalization statistics for a second threshold number of batches have remained within a third threshold of the moving averages.

10. A system comprising one or more computers and one or more storage devices storing instructions that when executed by the one or more computers cause the one or more computers to perform operations of training a neural network that has a batch normalized first neural network layer, the operations comprising:
during the training, maintaining (i) moving averages of batch normalization statistics for the batch normalized first neural network layer and (ii) floating point weights for the batch normalized first neural network layer;
receiving a first batch of training data;
processing the first batch of training data through one or more layers of the neural network to generate a batch of layer inputs to the batch normalized first neural network layer;
determining batch normalization statistics for the first batch of training data using the floating point weights, comprising:
performing operations of the batch normalized first neural network layer on the batch of layer inputs using the floating point weights to generate a batch of initial layer outputs; and
computing batch normalization statistics based on the batch of initial layer outputs;
determining a correction factor from the batch normalization statistics for the first batch of training data and the moving averages of the batch normalization statistics;
generating batch normalized weights from the floating point weights for the batch normalized first neural network layer using the correction factor, comprising applying the correction factor to the floating point weights of the batch normalized first neural network layer;
quantizing the batch normalized weights to generate quantized batch normalized weights;
after quantizing the batch normalized weights, performing operations of the batch normalized first neural network layer on the batch of layer inputs using the quantized batch normalized weights to generate a batch of layer outputs, comprising:
applying the quantized batch normalized weights to each of the batch of layer inputs to generate a respective initial output for each layer input in the batch of layer inputs;
determining whether the training of the neural network has reached a first threshold;
in response to determining that the training of the neural network has reached the first threshold, switching to using a long-term moving average of the batch normalization statistics by refraining from dividing each respective initial output by the correction factor to introduce a dependence on the batch normalization statistics;
determining, using the batch of layer outputs, a gradient of an objective function with respect to the quantized batch normalized weights for the first neural network layer; and
updating the floating point weights of the first neural network layer using the gradient with respect to the quantized batch normalized weights.

11. The system of claim 10, wherein the batch normalization statistics include a standard deviation for the batch and a mean for the batch and the moving averages include a standard deviation moving average and a mean moving average.

12. The system of claim 11, wherein the correction factor is based on a ratio of standard deviation for the batch to the standard deviation moving average.

13. The system of claim 10, wherein applying the correction factor comprises multiplying the floating point weights by the correction factor.

14. The system of claim 10, wherein performing operations of the batch normalized first neural network layer on the batch of layer inputs using the quantized batch normalized weights to generate a batch of layer outputs comprises:
refraining from applying a bias correction to the layer outputs.

15. The system of claim 10, wherein performing operations of the batch normalized first neural network layer on the batch of layer inputs using the quantized batch normalized weights to generate a batch of layer outputs comprises:
applying a bias correction to the each initial output to generate the batch of layer outputs.

16. The system of claim 10, wherein performing operations of the batch normalized first neural network layer on the batch of layer inputs using the quantized batch normalized weights to generate a batch of layer outputs comprises:
adding a bias to each initial output.

17. The system of claim 10, further comprising updating the moving averages based on the batch normalization statistics for the first batch.

18. The system of claim 10, wherein determining whether the training of the neural network has reached a first threshold comprises:
determining whether a threshold number of training iterations have occurred; or
determining whether batch normalization statistics for a second threshold number of batches have remained within a third threshold of the moving averages.

19. One or more non-transitory computer-readable storage media storing instructions that when executed by one or more computers cause the one or more computers to perform operations of training a neural network that has a batch normalized first neural network layer, the operations comprising:
during the training, maintaining (i) moving averages of batch normalization statistics for the batch normalized first neural network layer and (ii) floating point weights for the batch normalized first neural network layer;
receiving a first batch of training data;
processing the first batch of training data through one or more layers of the neural network to generate a batch of layer inputs to the batch normalized first neural network layer;
determining batch normalization statistics for the first batch of training data using the floating point weights, comprising:
performing operations of the batch normalized first neural network layer on the batch of layer inputs using the floating point weights to generate a batch of initial layer outputs; and
computing batch normalization statistics based on the batch of initial layer outputs;
determining a correction factor from the batch normalization statistics for the first batch of training data and the moving averages of the batch normalization statistics;
generating batch normalized weights from the floating point weights for the batch normalized first neural network layer using the correction factor, comprising applying the correction factor to the floating point weights of the batch normalized first neural network layer;
quantizing the batch normalized weights to generate quantized batch normalized weights;
after quantizing the batch normalized weights, performing operations of the batch normalized first neural network layer on the batch of layer inputs using the quantized batch normalized weights to generate a batch of layer outputs, comprising:
applying the quantized batch normalized weights to each of the batch of layer inputs to generate a respective initial output for each layer input in the batch of layer inputs;
determining whether the training of the neural network has reached a first threshold;
in response to determining that the training of the neural network has reached the first threshold, switching to using a long-term moving average of the batch normalization statistics by refraining from dividing each respective initial output by the correction factor to introduce a dependence on the batch normalization statistics;
determining, using the batch of layer outputs, a gradient of an objective function with respect to the quantized batch normalized weights for the first neural network layer; and
updating the floating point weights of the first neural network layer using the gradient with respect to the quantized batch normalized weights.

20. The computer-readable storage media of claim 19, wherein determining whether the training of the neural network has reached a first threshold comprises:
determining whether a threshold number of training iterations have occurred; or
determining whether batch normalization statistics for a second threshold number of batches have remained within a third threshold of the moving averages.

* * * * *